J. LAUER, Jr.
DRAW BAR FOR TRACTORS.
APPLICATION FILED DEC. 2, 1918.
1,337,521.
Patented Apr. 20, 1920.
2 SHEETS—SHEET 2.
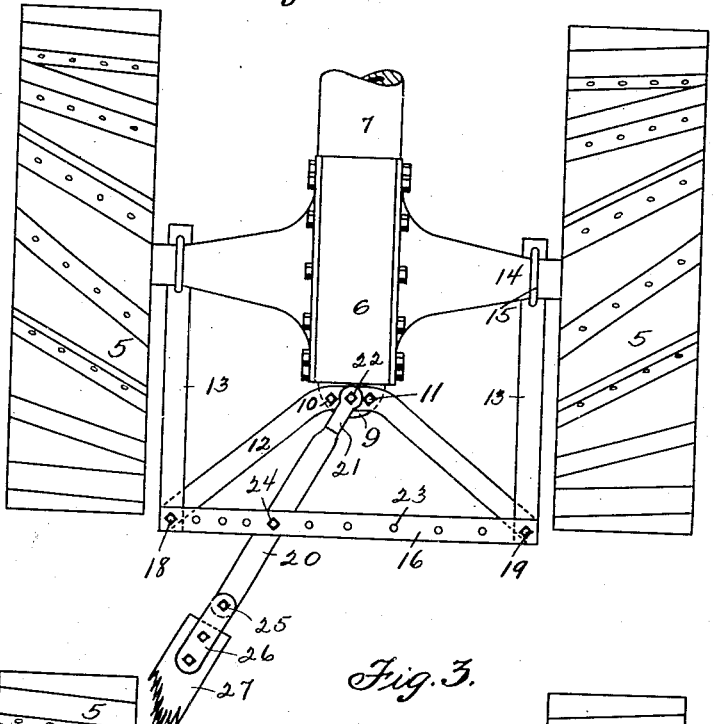
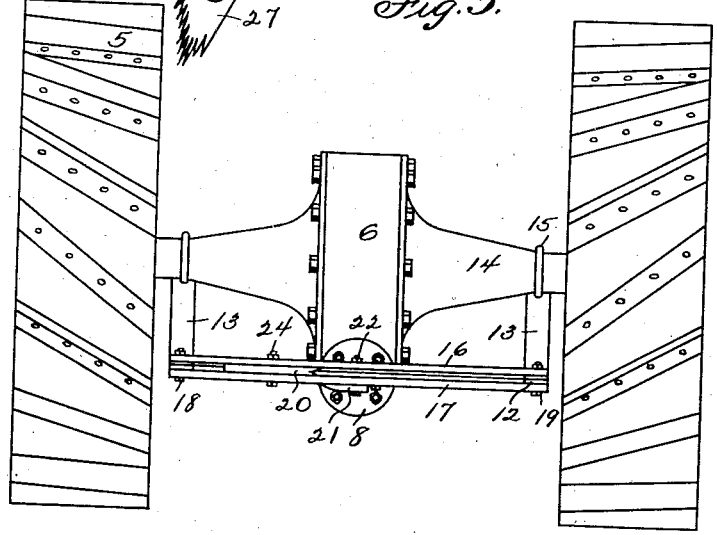
Inventor
Jacob Lauer, Jr.
By Samuel Herrick
Attorney

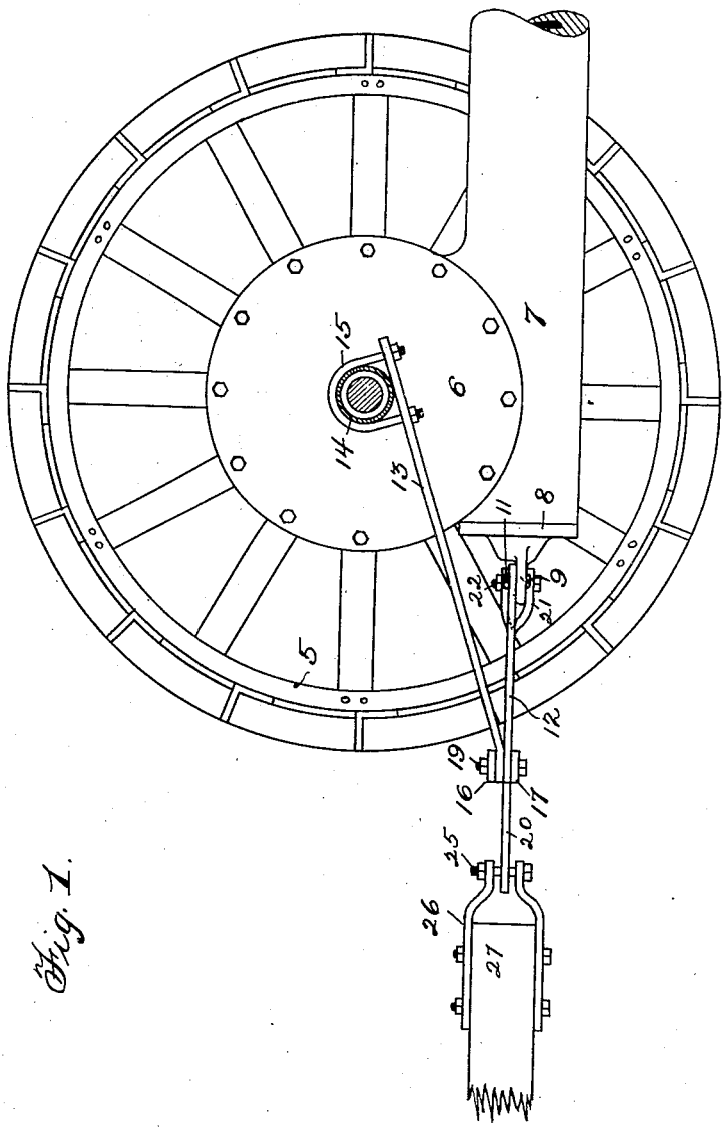

UNITED STATES PATENT OFFICE.

JACOB LAUER, JR., OF CHEROKEE, IOWA.

DRAW-BAR FOR TRACTORS.

1,337,521.

Specification of Letters Patent. Patented Apr. 20, 1920.

Application filed December 2, 1918. Serial No. 264,962.

*To all whom it may concern:*

Be it known that I, JACOB LAUER, Jr., a citizen of the United States of America, residing at Cherokee, in the county of Cherokee and State of Iowa, have invented certain new and useful Improvements in Draw-Bars for Tractors, of which the following is a specification.

This invention relates to an adjustable draw-bar for tractors and it has for its object the provision of means for mounting an adjustable draw-bar upon a well known type of tractor in such manner that machines drawn thereby may be caused to track directly behind the tractor or may be caused to travel in an offset position with respect thereto, either to the right or to the left as the case may be.

The well known Ford tractor is coming into wide spread use for plowing and for like purposes. However with the equipment with which it is placed upon the market, it is not feasible to use it for harvesting because no provision is made for causing the harvester to travel in an offset position with respect to the tractor, and the result is that the tractor must, if used, travel in the uncut grain. As this description proceeds it will be seen that the preesnt invention provides means for supporting an adjustable draw-bar with respect to such a tractor in such manner that the draw-bar may be readliy swung through a wide range of adjustment either to the right or to the left and held in such adjusted position.

Further objects and advantages of the invention will be set forth in the detailed description which now follows.

In the accompanying drawings,

Figure 1, is a side elevation of the device constituting the present invention with the near wheel of the tractor removed.

Fig. 2, is a plan view and

Fig. 3, is a rear elevation of the tractor with the attachment applied thereto.

Like numerals designate corresponding parts in all of the figures of the drawings.

In the drawings, 5 designates the usual bull wheel of the tractor and 6 the transmission casing. A worm shaft housing, 7, carries a cap 8 upon its rear end. This cap is provided with a horizontally disposed ear 9 which constitutes a point of attachment for machines to be drawn in the ordinary use of tractors of this type, such as plowing for example. In carrying out my invention I secure to the ear 9, by bolts 10 and 11, a strap 12. Braces 13 are supported from the axle housing 14 of the tractor by means of U bolts 15 and the other ends of these braces rest upon the straps 12. Spaced parallel bars 16 and 17 are disposed above and below the braces 13 and the straps 12 and these bars and the braces and the straps 12 are tied together by bolts 18 and 19. A draw-bar 20 is provided with a forked end 21 which straddles the ear 9 and the strap 12 and is pivotally connected by a bolt 22 with said strap and ear. The outer portion of this draw-bar is adapted to have horizontal swinging movement between the bars 16 and 17 and these bars are provided with perforations 23 for the reception of a locking pin or bolt 24 which is adapted to traverse the bars 16 and 17 and the draw bar 20 and to hold said draw-bar in any desired angular position with respect to the longitudinal axis of the tractor. At its other end the draw-bar 20 is adapted for connection with a pin or bolt 25 carried by plates 26, which are in turn carried by the tongue 27 of the harvester or other agricultural machine, to be drawn.

From the foregoing description it will readily be apparent that the machine to be drawn may be caused to track in an offset position either to the right or left of the line of travel of the tractor, and that the degree to which the machine being drawn is offset with respect to the tractor may be readily adjusted by swinging the draw bar in a horizontal plane and securing it in properly adjusted position by means of the bolt 24. The means by which these highly advantageous results are secured are of the utmost simplicity, may be manufactured at a very small cost, and may be attached by persons having no particular mechanical skill and with ordinary tools, such as a wrench or the like.

While the elements shown and described are well adapted to serve the purposes for which they are intended it is to be understood that the invention is not limited to the precise construction set forth but that it includes within its purview whatever changes fairly come within the spirit of the appended claims.

Having described my invention what I claim is:

1. In a device of the character described the combination with a tractor having a shaft housing and a cap upon the rear end thereof, of a horizontally disposed ear upon said cap, a strap having its intermediate portion fixed to said ear, braces extending between the opposite ends of said strap and the axle housings of the tractor, spaced parallel bars extending between and secured to the ends of said braces and the opposite ends of said strap, a draw-bar pivoted to the ear and having horizontal swinging movement between said parallel bars, and means for holding said draw-bar in varying positions of adjustment between said parallel bars.

2. In a device of the character described the combination with a tractor having a shaft housing and a cap upon the rear end thereof, of a horizontally disposed ear carried by said cap, a strap rigidly fixed to said ear, braces extending from the outer ends of the strap to the axle housings of the tractor, U bolts spanning said housings and securing said braces thereto, a bar extending between and secured to the opposite ends of the strap, a draw-bar pivotally connected to the ear and having horizontal swinging movement with respect to said bar and means traversing the bar and the draw-bar.

In testimony whereof I affix my signature in the presence of two witnesses.

JACOB LAUER, Jr.

Witnesses:
W. K. HERRICK,
E. C. HERRICK.